Feb. 5, 1929.  E. D. NERNEY  1,701,009
EYEGLASS CONSTRUCTION
Filed March 27, 1924
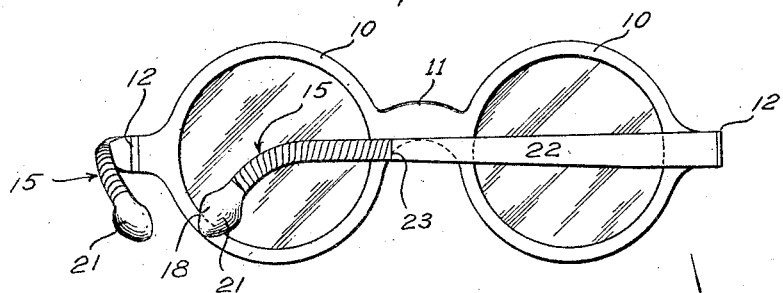
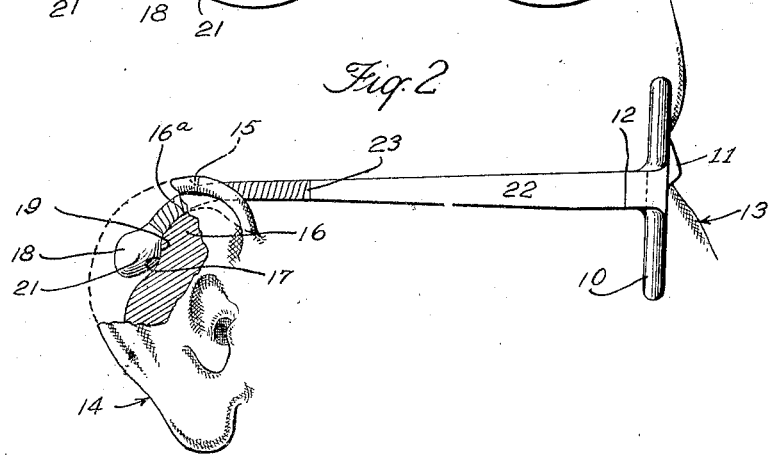
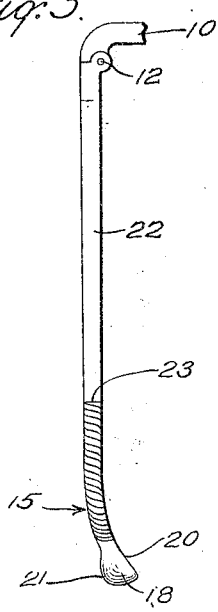
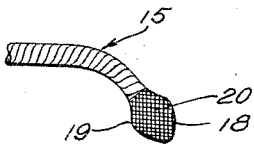
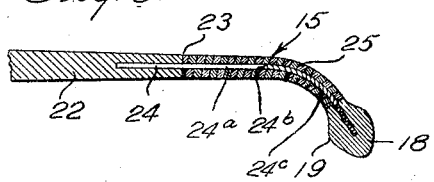
INVENTOR
Edwin D. Nerney
BY
Robert S. Blair
ATTORNEY Patented Feb. 5, 1929.

1,701,009

UNITED STATES PATENT OFFICE.

EDWIN D. NERNEY, OF ATTLEBORO, MASSACHUSETTS, ASSIGNOR TO BAY STATE OPTICAL COMPANY, OF ATTLEBORO, MASSACHUSETTS, A CORPORATION OF MAINE.

EYEGLASS CONSTRUCTION.

Application filed March 27, 1924. Serial No. 702,200.

This invention relates to construction for eyeglasses and more particularly to construction for eyeglass temple bars.

One of the objects of the invention is to provide a construction of the above nature practical and efficient and capable of meeting the requirements of use in a highly satisfactory manner. Another object is to provide a temple bar construction adapted to dependably hold the eyeglasses in position upon the wearer. Another object is to provide such a construction neat and unobtrusive and adapted to assume a comfortable position upon the wearer thereof. Another object is to provide a construction of the above nature capable of compact and convenient disposition when not in use. Another object is to provide a temple bar construction conveniently adjustable to the varying conditions of practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of the various possible embodiments of this invention, Figure 1 is a rear elevation of a pair of eyeglasses showing one temple bar in folded position and the other extended.

Figure 2 is a side elevation of the eyeglasses in position upon the wearer.

Figure 3 is a top plan view of one of the temple bars.

Figure 4 is a side elevation of the rear end portion of one of the temple bars, and Figure 5 is a vertical longitudinal section through the rear end portion of the temple bar.

Similar reference characters refer to similar parts throughout the several views of the drawing.

Referring now to the drawing in detail, there is shown a pair of eyeglass rims 10 connected by a bridge 11 and provided with a pair of rearwardly extending temple bars hinged thereto as at 12. It is to be understood that any desired form of lens mounting may be employed with the temple bars hinged thereto in any suitable manner, the lens mounting shown in the drawing being only for purposes of illustration. The two temple bars are similar in construction so that the following description refers to both, and the same reference characters will be employed to indicate similar parts in both. In operative position the temple bars are swung upon their hinges 12 to the position indicated by the left-hand temple bar in Figure 1 to extend rearwardly along the side of the head and, when the eyeglasses are not in use, the temple bars may be folded to the position indicated by the right-hand temple bar in Figure 1.

In Figure 2, the eyeglasses are shown in position upon the wearer, the bridge 11 resting upon the nose 13 to support the weight of the eyeglasses and the temple bar extending rearwardly over the ear 14 to hold the eyeglasses against slipping forwardly. As is shown in this figure, the rear end portion of the temple bar is bent or curved downwardly at 15 to arch over a portion of the ear 14. The portion of the ear over which this curved part 15 of the temple bar passes, is the portion of the ear joining the upper part thereof to the side of the head, this upper joining portion being indicated at 16 and the top surface thereof being indicated at 16$^a$. The temple bar is of such length that it terminates rearwardly of and adjacent this upper joining portion 16 of the ear. The rear wall of the portion of the ear joining the ear to the head is not regular in curvature, but has a forward depression 17 located rearwardly of the upper joining portion 16. The temple bar terminates preferably closely adjacent this depression 17 and is provided with a widened tip portion 18, it being understood that by the term "widened" as employed herein, is meant widened as viewed in Figure 2. This widened tip 18 is provided with a curved surface 19 which is adapted to mate with, and hook into the depression 17.

It will be seen that, by the curved surface 19 of the tip portion 18 thus resting in the depression 17, a secure holding of the eyeglasses against forward slipping is accomplished. Preferably, as shown in Figure 3, the rear end portion of the temple bar is curved inwardly toward the side of the head, as well as downwardly. The tip portion 18 is preferably substantially flat on its side 20 which engages the side of the head, and, as shown in Figure 4, this flat surface 20 is preferably roughened as by knurling. The opposite surface 21 is preferably raised or thickened, it being understood that by the term "thickened" as employed herein, is meant an increase in width as viewed in Figure 3. This raised surface 21 of the tip portion 18 tends to cause the tip portion to wedge between the side of the head and the ear, thus further increasing the holding action of the temple bar. This raised surface 21 is also preferably smoothly rounded and the tip portion 18 is preferably tapered or pointed at the end as viewed from the side to facilitate its insertion through the hair and into place.

There is thus provided a temple bar which is of short length and which provides a secure and dependable mounting. The shortness of length is of great advantage when the eyeglasses are not in use and the temple bars are swung to folded position. As indicated by the position of the right-hand temple bar, shown in Figure 1, the temple bars are of such length that they fold compactly against the eyeglass rims without bulky protruding ear pieces.

These temple bars, as described above, may be made of any desired material, but preferably, and as illustratively shown in the drawing, they are formed of celluloid, it being understood that the term "celluloid" as employed herein, is to be interpreted broadly throughout to comprehend various non-metallic substances of a nature similar to that of celluloid and adapted to form eyeglass frames and associated parts. Furthermore, the forward main body portion of the temple bars is preferably substantially rigid and the curved rear end portions are preferably flexible, being springy and resilient, adapted to yieldingly engage the ear and head.

As shown in the drawing, the forward main body portion 22 of celluloid, joined at its forward end to the lens mounting and extending rearwardly therefrom, terminates at 23. As brought out in Figure 5, embedded in the rear end of the main body portion 22 is a metallic wire extension or core 24 extending rearwardly therefrom and along the curved portion 15 of the temple bar. About this metallic extension 24 is a flexible celluloid covering comprising, for example, a spirally wound strip 25 of celluloid. The tip portion 18 of the temple bar, above described in detail, preferably comprises a cap member of celluloid secured to the end of the metallic extension or core 24. The ends of the spiral celluloid winding 25 are secured by suitable means to the end 23 of the body portion 22 and to the cap 18 so that the metallic core 24 is completely covered.

The forward portion 24ª of the metallic extension 24, extending rearwardly from the body member 22 to a point 24ᵇ, for example, is preferably bendable and easily adjustable, being adapted, when bent, to retain the contour to which it is bent, whereas the remaining end portion 24ᶜ is flexible, being springy and resilient. The portion of the temple bar having therein the part 24ª of the metallic extension or core is therefore readily adjustable in curvature so that the curved portion of the temple bar may be conveniently adjusted to the curvature of the portion of the ear upon which it is adapted to rest. The degree to which the end portion of the temple bar curves inwardly toward the surface of the head, may also be adjusted by bending this adjustable portion. The resilient part 24ᶜ of the core 24 may comprise a spirally wound wire member as indicated in the drawing. This flexible or resilient portion causes the tip member 18 to yieldingly engage the head and ear, making for the greatest comfort to the wearer and a secure holding action.

From the above it will be seen that there is herein provided a construction which embodies the features of this invention and attains many practical and useful advantages.

As many possible embodiments may be made of the above invention and as many changes might be made in the embodiment above set forth, it is to be understood that all matter hereinbefore set forth is to be interpreted as illustrative and not in a limiting sense.

I claim as my invention:

1. In eyeglass construction, in combination, a temple bar having means at its forward end for connection with an eyeglass frame and terminating at its rear end in an enlarged tip portion, the portion immediately forwardly of said tip portion being shaped to curve downwardly over the ear and inwardly toward the side of the head to grip the head, and the temple bar being of such length that said enlarged tip portion rests in back of and adjacent the upper portion of the ear.

2. In eyeglass construction, in combination, a temple bar having means at its forward end for connection with an eyeglass frame and terminating at its rear end in an enlarged tip portion, the portion immediately forwardly of said tip portion being shaped to curve downwardly over the ear and inwardly toward the side of the head to grip the head, the temple bar being of such length that said enlarged tip portion rests in back of and adjacent the upper portion of the ear, and said tip portion being flattened on its inner side to provide a flat bearing surface against the side of the head.

3. In eyeglass construction, a temple bar joined at its forward end to a lens mounting and extending rearwardly therefrom, the rear end portion thereof being shaped to curve over the ear and terminating in back of and closely adjacent to the upper portion thereof, said rear end portion having on its side facing the head a substantially regular surface adapted to engage the side of the head, and on its opposite side a rounded surface adjacent the tip.

4. In eyeglass construction, a temple bar joined at its forward end to a lens mounting and extending rearwardly therefrom, the rear end portion thereof being shaped to curve over the ear and inwardly and terminating in back of the upper portion thereof, said rear end portion having a tip portion with a substantially flat roughened surface adapted to bear against the side of the head and a smooth raised surface on the opposite side.

5. In eyeglass construction, a temple bar joined at its forward end to a lens mounting and extending rearwardly therefrom, the rear end portion thereof being shaped to curve downwardly over the ear and having an enlarged end portion adapted to wedge between the ear and the side of the head, the side of said end portion which bears against the head having a substantially flat surface.

6. In eyeglass construction, a temple bar joined at its forward end to a lens mounting and extending rearwardly therefrom, the rear end portion thereof being shaped to curve downwardly over the ear having a widened tip adapted to rest in back of the portion of the ear joining the upper part thereof to the head and having a surface shaped to rest in a depression located at the back surface of said upper joining portion of the ear.

7. In eyeglass construction, a temple bar joined at its forward end to a lens mounting and extending rearwardly therefrom, the rear end portion thereof being shaped to curve downwardly over the ear and having a widened and pointed tip portion adapted to rest in back of the portion of the ear joining the upper part thereof to the head and having a curved surface shaped to coact with a depression located in the rear surface of said upper joining portion of the ear.

8. In eyeglass construction, a temple bar joined at its forward end to a lens mounting and extending rearwardly therefrom, the rear end portion thereof being shaped to curve downwardly over the ear and having a widened and thickened tip portion adapted to rest in back of the portion of the ear joining the upper part thereof to the head and having a curved surface shaped to coact with a depression located in the rear surface of said upper joining portion of the ear.

9. In eyeglass construction, a temple bar joined at its forward end to a lens mounting and extending rearwardly therefrom, the rear end portion thereof being shaped to curve downwardly over the ear and having a widened tip portion resting in back of the portion of the ear joining the upper part thereof to the head, said tip portion having a substantially flat roughened surface facing the side of the head, a rounded surface opposite thereto and a curved surface adapted to coact with a depression located in the back surface of said upper joining portion of the ear.

10. In eyeglass construction, in combination, a temple bar comprising a relatively rigid forward portion having means at its forward end for connection with an eyeglass frame, and a relatively flexible rear end portion, the rear portion of said temple bar being shaped to curve downwardly over the ear and terminating in back of and adjacent the upper portion of the ear, said flexible rear end portion being adapted to grip the part of the head which it engages.

11. In eyeglass construction, in combination, a temple bar comprising a relatively rigid forward portion having means at its forward end for connection with an eyeglass frame, and a relatively flexible rear end portion, the rear portion of said temple bar being shaped to curve downwardly over the ear and terminating in back of and adjacent the upper portion of the ear, said flexible rear end portion terminating in a tip member which has a substantially flat surface adapted to bear against the side of the head and an opposite surface which is shaped to wedge against the ear.

12. In eyeglass construction, a temple bar of celluloid joined at its forward end to a lens mounting and extending rearwardly therefrom, the rear end portion thereof being shaped to curve over the ear and downwardly and terminating in back of and adjacent the upper portion of the ear, said rear end portion comprising a rear end resilient portion and a forward portion adjustable in curvature.

13. In construction for eyeglass temple bars, in combination, a substantially rigid main body portion of celluloid joined at its forward end to a lens mounting, a flexible metallic extension extending rearwardly therefrom shaped to curve over the ear and terminating adjacent to and rearwardly of the upper portion of the ear, and a flexible covering of celluloid about said extension urged inwardly against the head by said flexible metal member therein.

14. In construction for eyeglass temple bars, in combination, a substantially rigid main body portion of celluloid joined at its forward end to a lens mounting, a flexible metallic extension extending rearwardly therefrom shaped to curve over the ear and terminating adjacent to and rearwardly of the upper portion of the ear, and a flexible covering of celluloid about said extension, said metallic extension comprising an adjustable portion and a resilient portion and the end thereof bearing inwardly toward the side of the head.

15. In construction for eyeglass temple bars, in combination, a substantially rigid main body portion of celluloid joined at its forward end to a lens mounting, a flexible metallic extension extending rearwardly therefrom shaped to curve over the ear and terminating adjacent to and rearwardly of the upper portion of the ear, a flexible covering of celluloid about said extension, and an enlarged tip member of celluloid connected at the end of said metallic extension.

16. In construction for eyeglass temple bars, in combination, a substantially rigid main body portion of celluloid joined at its forward end to a lens mounting, a flexible metallic extension extending rearwardly therefrom shaped to curve over the ear and terminating adjacent to and rearwardly of the upper portion of the ear, a flexible covering of celluloid about said extension, and a tip member of celluloid connected at the end of said metallic extension having a surface adapted to coact with a depression located at the back of the ear.

17. In construction for eyeglass temple bars, a temple bar comprising in combination a substantially solid and substantially rigid forward portion adapted to be connected at its forward end to an eyeglass frame, a substantially solid rear tip portion of celluloid, and an intermediate portion adapted to curve downwardly over an upper portion of the ear, said intermediate portion comprising a tubular member formed of a spiral coil of celluloid and a metal core within said tubular member, said metal core being capable of being bent to adjust the curvature of said curved portion of the temple bar and being substantially non-resilient so that when bent it retains the shape given thereto, and said temple bar being of such length that said tip portion rests in back of and adjacent said upper portion of the ear.

18. In construction for eyeglass temple bars, a temple bar comprising in combination a substantially solid and substantially rigid forward portion adapted to be connected at its forward end to an eyeglass frame, a substantially solid rear tip portion of celluloid, and an intermediate portion adapted to curve downwardly over an upper portion of the ear, said intermediate portion comprising a tubular member formed of a spiral coil of celluloid and a metal core within said tubular member, said metal core comprising two portions one of which is flexible and resilient adapted when flexed to spring back to its original shape, and the other of which is capable of being bent to adjust the curvature thereof and substantially non-resilient so that when bent it retains the shape given thereto, and said temple bar being of such length that said tip portion rests in back of and adjacent said upper portion of the ear.

In testimony whereof, I have signed my name to this specification this twenty-second day of March, 1924.

EDWIN D. NERNEY.